March 20, 1934. S. POGANITZ ET AL 1,951,440
MACHINE FOR HOLDING SLICED BREAD WHILE BEING WRAPPED
Filed July 30, 1932 2 Sheets-Sheet 1
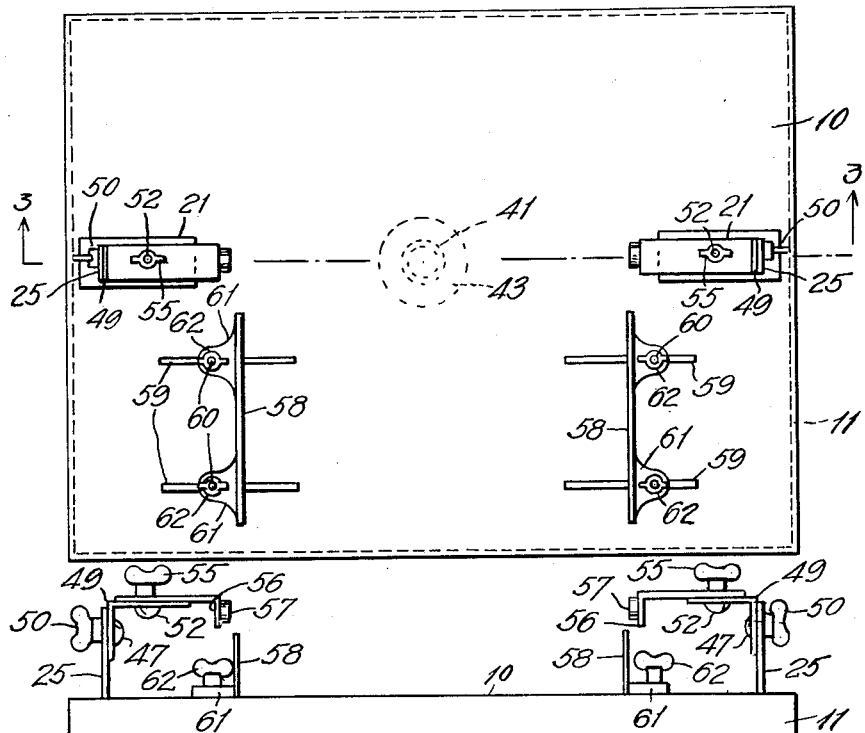
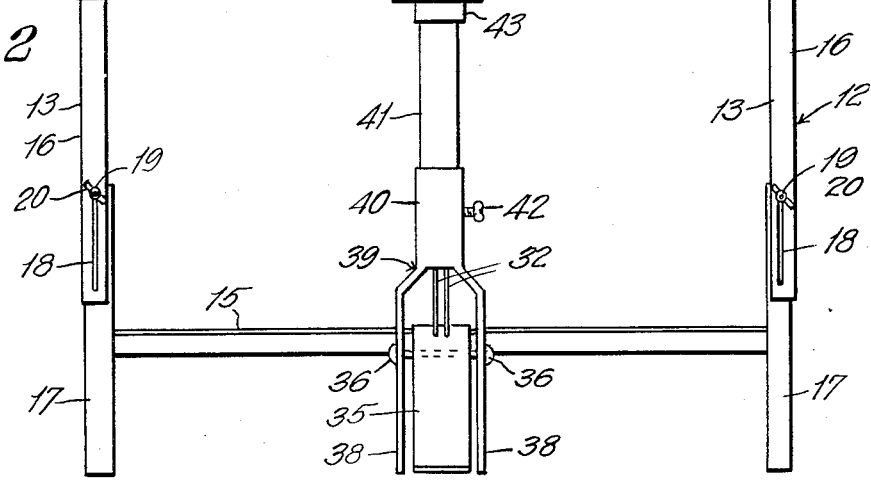
INVENTORS
Stefan Poganitz
Joseph Poganitz
By W. W. Williamson
Atty.

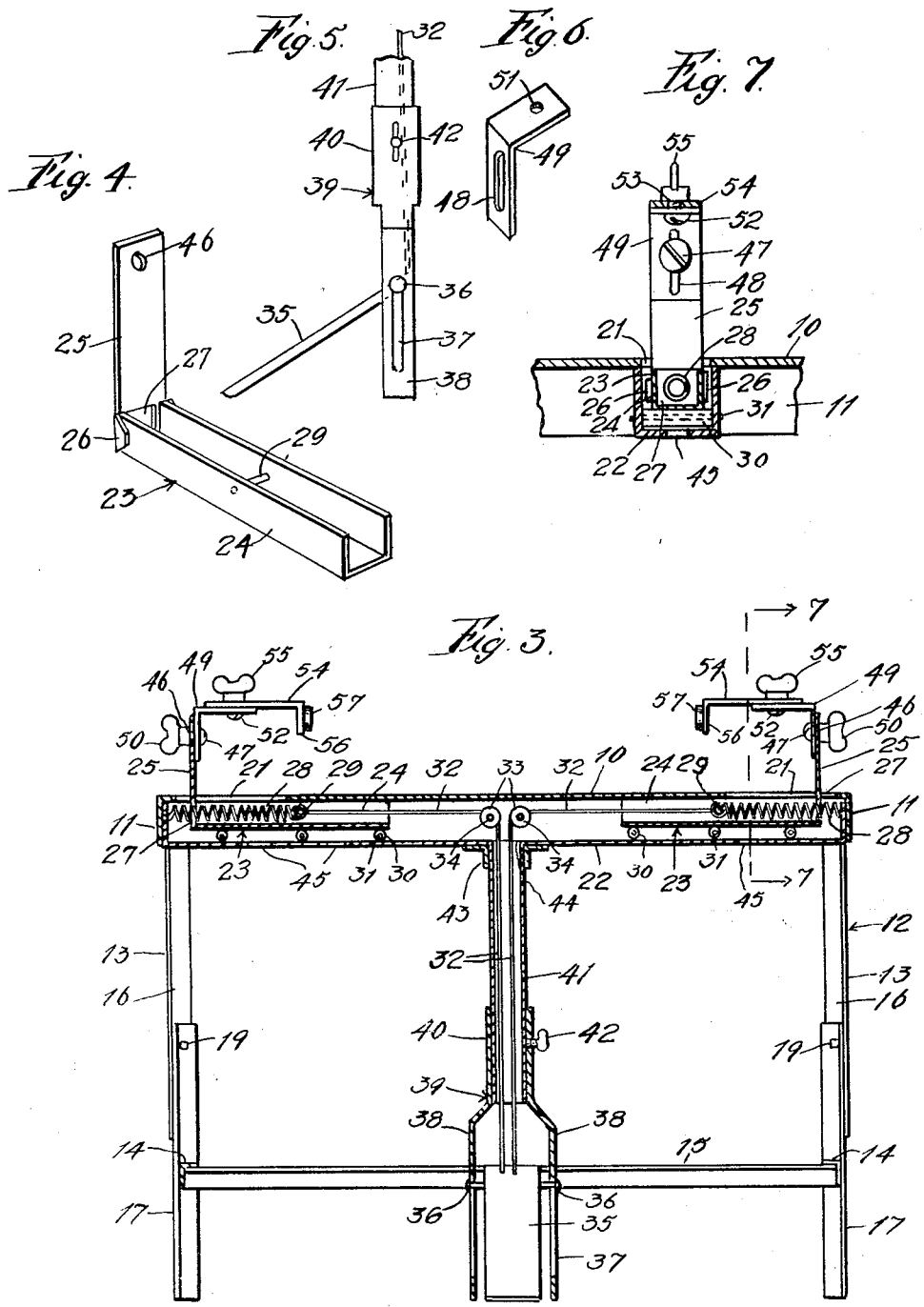

Patented Mar. 20, 1934

1,951,440

UNITED STATES PATENT OFFICE 1,951,440

MACHINE FOR HOLDING SLICED BREAD WHILE BEING WRAPPED

Stefan Poganitz and Joseph Poganitz, Camden, N. J.

Application July 30, 1932, Serial No. 627,154

5 Claims. (Cl. 93—2)

Our invention relates to new and useful improvements in a machine for holding sliced bread while being wrapped and has for one of its objects to provide a simple, strong, durable and inexpensive device of this kind which may be manually operated to hold a loaf of sliced bread while the wrapper is being folded thereabout by hand, which machine is manually operated and therefore can be used by any small bakery.

Another object of the invention is to provide a table or platform carrying manually operated means for clamping or gripping a loaf of sliced bread to hold the same in a predetermined position with all of the slices in even arrangement to permit quick wrapping of said loaf of bread.

Another object of the invention is to provide a table or platform adjustable as to height whereby it may be operated by persons of varying stature.

Another object of the invention is to provide slides carrying gripping elements which slides are spring actuated in one direction and operable in the opposite direction by a person's foot whereby said person's hands are left free for accomplishing the wrapping operations.

A further object of the invention is to provide means for adjusting several elements of the gripping means to adapt said gripping means for use in connection with loaves of bread of various dimensions.

A further object of the invention is to provide unique structures for the several parts of the machine.

With these and other ends in view, this invention consists in the details of construction and combination of elements hereinafter set forth and then specifically designated by the claims.

In order that those skilled in the art to which this invention appertains may understand how to make and use the same, we will describe its construction in detail, referring by numerals to the accompanying drawings forming a part of this application, in which:—

Fig. 1 is a top plan view of a machine constructed in accordance with our invention.

Fig. 2 is a front elevation thereof.

Fig. 3 is a section of the machine on the line 3—3 of Fig. 1, looking in the direction of the arrows.

Fig. 4 is an enlarged detail perspective view of one of the slides.

Fig. 5 is a fragmentary side elevation of the foot pedal mounting.

Fig. 6 is an enlarged perspective view of the angle iron which is one of the elements of one of the gripping or clamping devices.

Fig. 7 is an enlarged fragmentary sectional view on the line 7—7 of Fig. 3.

In carrying out our invention as herein embodied, 10 represents a table top or platform, preferably produced from metal although any other suitable material may be used, and while not essential, we prefer that the edges of said table top or platform be provided with down turned flanges 11.

The table top is mounted upon any suitable supporting structure 12 here-shown as a frame comprising adjustable legs 13 and to each end pair is fastened a cross brace 14, while between the cross braces is a spreader 15.

Each leg preferably comprises an upper part 16 fastened to the table top and a lower part 17 slidably mounted longitudinally relative to the upper part. One of these parts, as the upper part 16, is provided with a longitudinal slot 18, while the other part, as the lower part 17, carries a bolt 19 projecting through the slot 18 and having a wing nut 20 threaded thereon so that when the desired adjustment is obtained the parts may be temporarily held in their adjusted positions. In this way the height of the table top may be varied according to the stature of the person operating the machine.

In the table top are formed two slots 21 in endwise alignment on a line intermediate the front and back edges of said table top and preferably in the rear portion thereof when it is considered that the table top need only be approximately twenty-two inches long and about the same or even of less width, but since we are not limiting ourselves to any particular dimensions the above mentioned sizes are given only that persons skilled in the art may visualize how small the machine may be made to accomplish the objects herein set forth.

Beneath the table top is mounted a trough or channel 22 which extends all the way from one side of the table top to the other or all the way from one slot to the other so that both of said slots are in complete communication with the interior of the trough or channel. Said trough or channel includes a bottom, two sides and two end walls.

In each end of the channel or trough 22 is reciprocatingly mounted a slide 23 including a body 24 U-shaped in cross section with one end wide open while at the other end is formed an upwardly projecting standard 25 which extends through one of the slots 21, and from the side edges at the lower end of the standard project wings 26 which assist in supporting the standard in an upright position.

At the lower end of the standard is also formed an aperture 27 through which a coil spring 28 projects with one end of said spring anchored to an end wall of the trough or channel, while the other end of said spring is connected to a pin 29 lying across the U-shaped body of the slide and fixed in the side walls thereof.

The spring normally holds the slide and component parts outward toward an edge of the table top and in order that said slide may reciprocate with as little friction as possible, it may rest upon rollers 30 journalled on axles 31 crosswise of the trough or channel and fixed in the side walls of the latter.

In order to actuate the slides in opposition to the springs 28, a pair of cables 32 are provided, each of which is connected to the pin 29 of one of the slides and runs out through the open inner end thereof and over a grooved pulley 33 journalled on an axle 34, the ends of which are mounted in the side walls of the trough or channel, thence downward to a foot pedal 35.

As herein illustrated, one end of the foot pedal 35 rests on the floor or surface supporting the machine, while the other end is provided with pins or trunnions 36 slidably mounted in vertical slots 37 in the legs 38 of a pedal support 39 which also includes a tubular neck 40 slidably mounted upon a pipe 41 and held in various adjustments by a set screw 42 or its equivalent. The upper end of the pipe 41 is attached to the bottom wall of the trough or channel midway the ends of the latter as by a collar 43, and said pipe enters or aligns with a hole 44 in the bottom of the trough or channel through which the cables pass.

In order to prevent the accumulation of foreign substances, such as bread crumbs, pieces of paper or the like in said trough or channel, the bottom wall thereof is provided with a number of perforations 45.

Near the upper end of the standard 25 of each slide is formed a hole 46 for the reception of a screw 47 which also projects through a slot 48 in one of the legs in the angle iron 49 and with a butterfly nut 50 on the screw, the angle iron may be held in various vertical adjustments. The other arm of the angle iron has a hole 51 therein in which is mounted a screw 52 also passing through a slot 53 in the clamping jaw 54 and with a butterfly nut 55 on the screw 52 the clamping jaw may be held in various adjusted positions.

The inner end of the clamping jaw has a depending lip 56 on which is rotatably mounted a disc 57 and it is said disc that makes the actual contact with an end of a loaf of bread when the clamping devices are actuated for such purpose.

On the table top forward of the clamping means are mounted a pair of adjustable guides 58 for holding a pack of paper wrappers in proper alignment. As herein illustrated each guide overlies a pair of slots 59 in the platform or table top with screws 60 projecting through said slots and through lugs 61 on the guide and with each screw having a butterfly nut 62 threaded thereon for clamping the guide in any adjusted position.

In practice the slides 23 and their component parts are drawn outward or away from each other by the springs and are normally held in said outward positions. A pile of paper wrappers are placed upon the table top or platform between the guides 58 and they will extend approximately from the front to the back edges of said platform.

The clamping devices are adjusted to accommodate a particular size of loaf of bread being wrapped. The loaf of sliced bread is then placed in the space between the clamping jaws so as to rest upon the pile of paper wrappers and the foot pedal is operated so as to move the slides toward each other until the clamping jaws engage the end of said loaf of bread and slightly compress the same. The operator may then remove his hands from the loaf of bread and fold the ends of the uppermost paper wrapper about the loaf finally folding in the edges at the ends of the loaf and sealing the same. As the operator begins to fold in the edges of the wrapper about the ends of the loaf, he releases the foot pedal and the springs 28 will move the slides outward to disengage the clamping jaws from the loaf of bread.

With a machine of this kind, a small sized bakery can expeditiously wrap a great many loaves of sliced bread with a small amount of labor and at little cost, and it has been actually found that with this particular machine a considerable saving has been effected.

Of course we do not wish to be limited to the exact details of construction as herein illustrated as these may be varied within the limits of the appended claims without departing from the spirit of our invention.

Having thus fully described our invention, what we claim as new and useful is:—

1. A machine for holding sliced bread while being wrapped, comprising a platform having spaced endwise aligned slots, a channel beneath said platform in communication with the slots, slides mounted to reciprocate in the ends of the channel and having standards projecting through the slots, springs to normally move the slides away from each other, means to be actuated by an operator's foot to move the slides in the opposite direction against the action of the springs, and clamping means carried by the standards to engage the ends of a loaf of bread.

2. The structure in claim 1, in combination with rollers in the channel on which the slides are mounted.

3. In a device of the kind described, the combination of a platform having spaced endwise aligned slots, a channel carried by the underside of said platform and in communication with both slots in said platform, said channel having perforations and a hole in the bottom wall thereof, a pair of grooved pulleys journalled in the channel in the region of the hole, rollers journalled in said channel adjacent each end, a U-shaped slide mounted in each end of the channel on the rollers, a standard projecting upwardly from the outer end of each slide and extending through a contiguous slot in the platform, said upright having an opening through the base end thereof, a pin across the interior of the slide, a spring having one end anchored on the pin and passing through the opening in the standard and the other end anchored to an end of the channel for normally moving the slide outward, a cable connected to the pin of each slide and passing around a pulley and through the hole in the channel whereby the slides may be simultaneously moved in opposition to the springs, a foot pedal to which the cables are fastened, a support for said foot pedal, a pipe enclosing parts of the cable and to which the pedal support is adjustably connected, an adjustable frame to support the platform, angle irons adjustably mounted on the standards, clamping jaws adjustably mounted on the angle irons, lips projecting downwardly from the inner ends of the jaws, and discs rotatably mounted on the opposed faces of the lips.

4. In a machine for holding sliced bread while being wrapped, a platform having spaced endwise aligned slots, a channel beneath said platform in communication with the slots, slides carrying bread clamping means mounted in said channel to be moved longitudinally thereof, a spring anchored to each end of the channel and connected with a slide intermediate the ends thereof for urging its respective slide toward the contiguous end of the channel, and means whereby said slides may be moved toward each other.

5. In a machine for holding sliced bread while being wrapped, a platform having spaced endwise aligned slots, a channel carried by the underside of said platform and in communication with both slots therein, a U-shaped slide mounted in each end of the channel, a standard projecting upwardly from the outer end of each slide and extending through a contiguous slot in the platform, said standard having an opening through the base end thereof, a spring anchored at each end of the channel and passing through the opening in the standard with the opposite end anchored to a slide intermediate the ends thereof for normally urging the slide toward the contiguous end of the channel, bread clamping means carried by the upper end of each standard, and means whereby the slides may be simultaneously moved toward each other against the urge of the springs to hold a loaf of bread between the clamping means.

STEFAN POGANITZ.
JOSEPH POGANITZ.